C. A. GLASS.
SHOCK ABSORBER.
APPLICATION FILED JULY 17, 1920.
1,387,536.
Patented Aug. 16, 1921.
2 SHEETS—SHEET 1.
Fig 1.
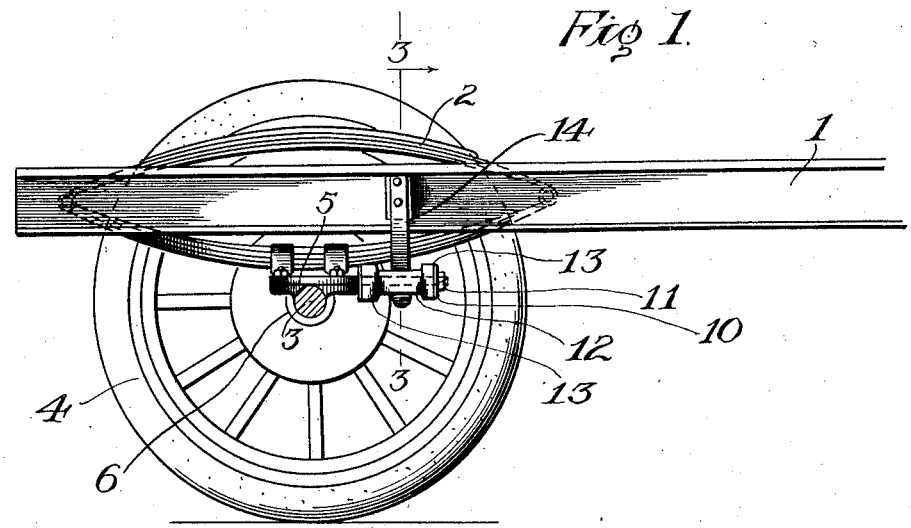
Fig 2.
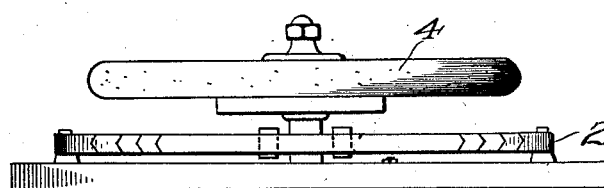
Fig 7.
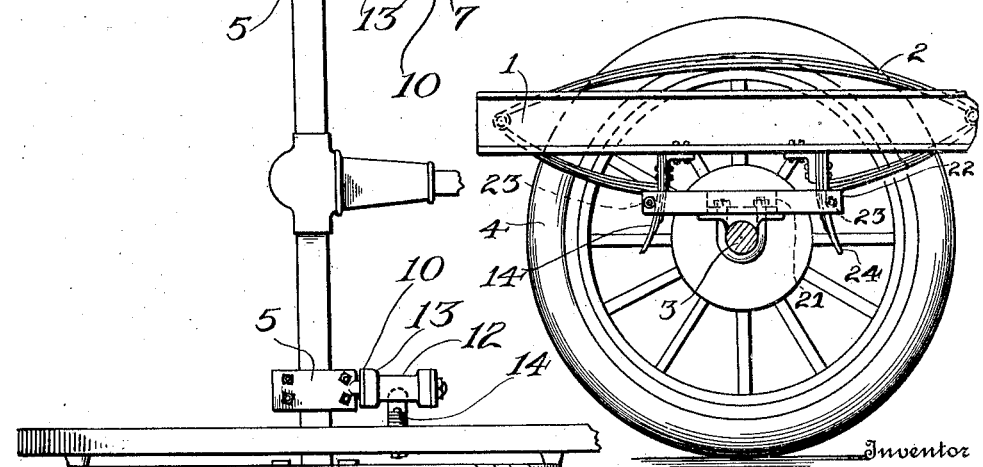
Inventor
C. A. Glass
Witnesses
By
Lacy & Lacy, Attorneys

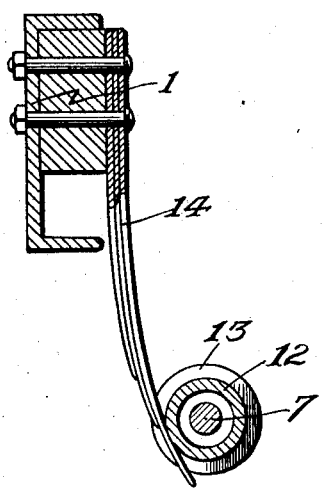
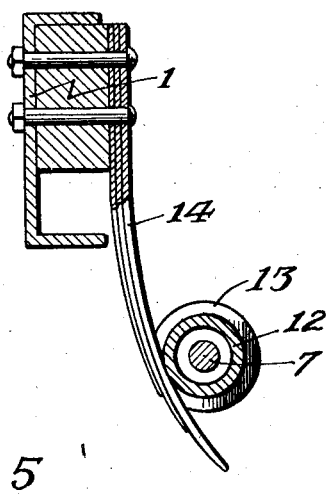
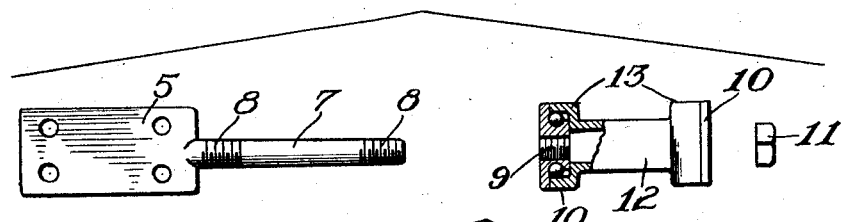
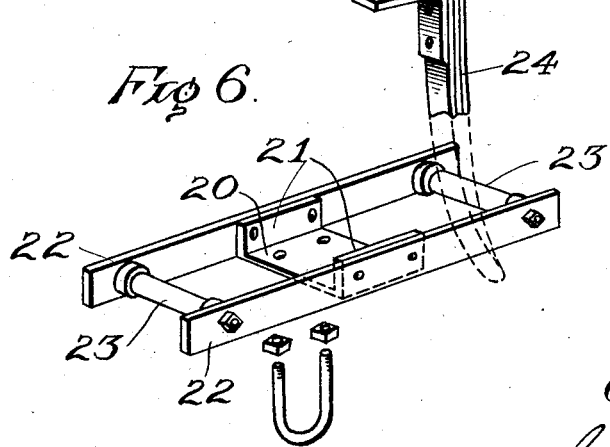

UNITED STATES PATENT OFFICE.

CHARLES A. GLASS, OF CHICAGO, ILLINOIS.

SHOCK-ABSORBER.

1,387,536.  Specification of Letters Patent.  Patented Aug. 16, 1921.

Application filed July 17, 1920. Serial No. 396,922.

*To all whom it may concern:*

Be it known that I, CHARLES A. GLASS, a citizen of the United States, residing at Chicago, in the county of Cook and State of Illinois, have invented certain new and useful Improvements in Shock-Absorbers, of which the following is a specification.

This invention relates to shock absorbers and has for its object the provision of a simple and efficient device which may be readily applied to any vehicle and by the use of which the occupants of the vehicle will be relieved of the shock incident to travel over ruts or rough roads and the comfort and pleasure of the occupants enhanced.

The invention is illustrated in the accompanying drawings and consists in certain novel features which will be hereinafter first fully described and then particularly pointed out in the claims following the description.

In the drawings:

Figure 1 is a side elevation of a portion of an automobile showing my shock absorber applied thereto;

Fig. 2 is a plan view of the same;

Figs. 3 and 4 are sectional elevations of the shock absorber illustrating different positions of the same;

Fig. 5 is a detail view, partly in plan and partly in horizontal section, of parts of the shock absorber;

Fig. 6 is a perspective view illustrating a different form of the invention;

Fig. 7 is an elevation of said form in operative position.

The frame 1 may be of any preferred type. It will be supported by the usual elliptical springs 2 upon an axle 3 carrying wheels 4, as will be readily understood.

Upon the axle and preferably at the inner sides of the frame, I provide base plates or brackets 5 which may rest directly on the axle and will be clamped thereto by clips 6 or equivalent devices. From one end, preferably the front end, of each base plate 5, a pin 7 projects longitudinally and said pin may be constructed with threaded portions 8, as will be readily understood. Upon one of said threaded portions 8, I engage a race ring 9 of a ball bearing and upon the other of said threaded portions, I engage a similar race ring 10 and a retaining nut 11. Supported by and extending between the ball bearings and encircling the pin 7 is a tubular roller 12 which will preferably be constructed with annular flanges 13 at its ends. To the sides of the frame 1, I rigidly secure the upper ends of leaf springs 14 which depend from the said side bars and have their lower ends projected inwardly so as to bear against the rollers 12 between the flanges 13, as shown clearly in Figs. 1, 2, 3 and 4. The leaf springs 14 will be so shaped and given such a degree of resiliency that they will bear frictionally against the rollers 12 and thereby serve as brakes and tend to hold the frame and the roller in a normal position. Should the wheels 4 in the course of travel strike an obstruction or a hollow so that there is a tendency to relative vertical movement between the wheels and the frame, the frictional engagement between the leaf springs 14 and the rollers 12 will tend to retard the movement of the body so that it will be very gradual and the occupants of the vehicle will be relieved of annoying and discomforting shocks. It will be readily noted upon reference to Figs. 3 and 4 that the lower free ends of the springs 14 tend to project under the rollers 12. Consequently, there is constant contact between these members and downward movement of the frame or body relative to the axle will be retarded and the relative upward movement of the body or frame will also be slow inasmuch as in such movement it will be necessary to overcome the effort of the leaf springs to hold their lower ends at points under the rollers. While there is constant frictional engagement between the springs and the rollers the ball bearings at the ends of the rollers will permit the rollers to rotate freely and, consequently, the wear upon the parts will be minimized.

In Fig. 6, I have illustrated a form of the invention in which springs may be provided in front of and in rear of the axle and the device thereby adapted for very heavy vehicles. In this form of the invention the base plate 20 is secured rigidly upon the upper side of the axle and is provided with upturned flanges 21 at both ends. Side bars 22 are secured to the said flanges and project forwardly and rearwardly of the axle, the rollers 23 being fitted between and supported by the ends of said side bars. The springs 24 will be secured to the bottom of the frame or truck instead of against the sides thereof and the lower ends of the springs will pass downwardly through the spaces between the base plate 20 and the rollers 23 so as to bear upon the rollers in the same manner as the springs 14 bear upon the rollers 12.

My device is exceedingly simple in the construction and arrangement of its parts and may be produced and applied to any existing vehicle at a very low cost. When in operation it will be found highly efficient and will not be apt to get out of order.

In both illustrated forms of the invention, the supporting member projects from the axle at the inner side of the frame and may be disposed under the vehicle body so that no part of the device will extend up beside the body to detract from the sightliness of the vehicle. The side of the body cannot come into contact with any part of the shock absorber and have its finish thereby marred nor can the shock absorber interfere with or retard the movements of an operator who may desire to raise or lower the vehicle top. Moreover, the arrangement of the parts permits the use of a long heavy spring so that even on exceedingly rough roads the relative movement of the parts will not carry the roller beyond the free end of the spring and it will not be necessary to provide terminal hooks to prevent such disengagement.

Having thus described the invention, what is claimed as new is:

1. In a shock absorber, the combination with a vehicle frame, and the axle, of a support secured to the axle at the inner side of the frame and projecting horizontally from the axle longitudinally of the frame, a roller mounted on the projecting portion of the support, and a leaf spring rigidly secured at its upper end to the vehicle frame and having its lower portion free and curved away from the vertical plane in which its upper end is secured to the frame, said free portion extending past and bearing constantly against the roller.

2. A shock absorber comprising a base plate adapted to be secured upon the axle of a vehicle, side bars secured to and projecting from the base plate, a roller mounted between the ends of the side bars, and a leaf spring adapted to be secured at its upper end to the body of the vehicle and having its lower free end extending between said side bars and bearing constantly against the roller.

In testimony whereof I affix my signature.

CHARLES A. GLASS. [L. S.]